United States Patent
Ismail (10) Patent No.: US 7,114,732 B1
(45) Date of Patent: Oct. 3, 2006

(54) ALL-TERRAIN WELDING CART

(75) Inventor: Jeffery A. Ismail, Auburn, CA (US)

(73) Assignee: Jeffery A Ismail, Auburn, CA (US)

( * ) Notice: Subject to any disclaimer, the term of this patent is extended or adjusted under 35 U.S.C. 154(b) by 35 days.

(21) Appl. No.: 10/718,864

(22) Filed: Nov. 21, 2003

(51) Int. Cl.
*B62B 11/00* (2006.01)

(52) U.S. Cl. .............................. 280/47.34; 280/47.24; 280/47.35

(58) Field of Classification Search ............... 280/6.15, 280/6.16, 651, 676, 656, 37, 639, 124.127, 280/124.139, 124.158, 124.159, 79.2, 79.4, 280/47.34, 124.11, 47.24, 79.11, 47.35
See application file for complete search history.

(56) References Cited

U.S. PATENT DOCUMENTS

| | | | | |
|---|---|---|---|---|
| 1,244,030 A | * | 10/1917 | Cave ........................ | 280/47.26 |
| 2,913,250 A | * | 11/1959 | La Fever ............. | 280/124.127 |
| 3,174,736 A | | 3/1965 | Cameron | |
| 3,942,449 A | * | 3/1976 | Nelson ....................... | 280/80.1 |
| 4,239,258 A | * | 12/1980 | Burris ........................ | 280/639 |
| 4,625,949 A | * | 12/1986 | Walker ..................... | 280/47.19 |
| 4,758,008 A | * | 7/1988 | Moddejonge ................ | 280/37 |
| 4,759,560 A | * | 7/1988 | Virgulti .................... | 280/47.26 |
| 4,778,154 A | | 10/1988 | Cortez, Jr. | |
| D322,501 S | | 12/1991 | Legault | |
| D370,330 S | * | 5/1996 | Carpenter et al. ........... | D34/21 |
| 5,693,286 A | | 12/1997 | Hatanaka et al. | |
| 5,950,754 A | * | 9/1999 | Ondrish, Jr. ................ | 180/181 |
| 5,997,018 A | * | 12/1999 | Lee ........................ | 280/87.042 |
| 6,109,644 A | | 8/2000 | Cox | |
| 6,116,623 A | | 9/2000 | Salvucci | |
| 2003/0218316 A1 | * | 11/2003 | Simpson ..................... | 280/656 |

* cited by examiner

*Primary Examiner*—Hau Phan (57) ABSTRACT

An all-terrain four wheel welding cart having an independent suspension system making the cart capable of traveling across a variety of terrains either by being manually pulled by a handle connected to the suspension system making it easy to control cart direction or by an interchangeable tow hitch which can replace the manual towing handle allowing the cart to be mounted onto a tow receiver and quickly driven away. Due to the cart's ground clearance, size of wheels and pneumatic tires, it can travel most terrains usually unavailable to standard welding carts.

17 Claims, 9 Drawing Sheets

ALL-TERRAIN WELDING CART

TECHNICAL FIELD OF THE INVENTION

The present invention relates generally to welding equipment carts and more specifically to a new and improved all-terrain four wheel cart having an independent suspension system capable of holding equipment and tools. The cart of the present invention is capable of traveling on level and uneven surfaces where standard welding carts with wheels do not presently go.

BACKGROUND OF THE INVENTION

It can be appreciated that welding carts have been around for years. These carts typically have two wheels and some have compartments for holding welding machinery, tools and gas/oxygen bottles.

Traditional welding carts are mainly two-wheeled, and pulled in and around welding shops or transported inside work truck beds and on utility-type towing trailers to job site locations.

An example of a prior art cart is shown in U.S. Pat. No. 6,116,623 with the title "Dual Cylinder Cart With Firewall Divider" issued Sep. 12, 2000 to Frank S. Salvucci. While being functional for its intended purpose which is to provide a firewall for two cylinders, it has not been designed to travel across rocky terrain, lacks independent suspension and makes no provision for dedicated tool holders nor is there space for hauling equipment.

U.S. Pat. No. 6,109,644 "Utility Wagon" issued Aug. 29, 2000 to Lem L. Cox discloses a wagon having a universal base upon which can be mounted a different chassis, it is not specifically designed for a gas cylinder or welder unit setup. This wagon has no rotating base under and supporting the welding unit nor are there dedicated tool holders or independent suspension. It would not be workable for the purpose of the present invention.

U.S. Pat. No. 5,693,286 "Cart Mounting A Welding Torch Or Cutting Torch" issued Dec. 2, 1997 to Isamu Htanaka, Yariaki Kaneko and Kenichi Nezu shows a welding cart designed to run on a guide track and not specifically designed to hold a gas cylinder nor is there independent suspension allowing it to traverse rough terrain.

U.S. Pat. D322,501 "Welding Cart" issued Dec. 17, 1991 to Timothy J. Legault is an all-purpose carrying cart that is workable for the purpose intended but does not have four wheels, independent suspension, nor the ability to carry a bottle and welding unit. It would not in its present state be capable of traveling on rough terrain.

U.S. Pat. No. 4,778,154 "Welding Torch Carriage" issued Oct. 18, 1988 to Crespin Cortez, Jr. discloses a cart specifically designed to hold a welding torch in a chosen welder line. Though workable for its intended purpose, it would not be workable when compared to the present invention since the carriage does not have independent suspension, lacks four wheels, makes no provision for a gas bottle and is therefore limited to the purpose it was designed for.

U.S. Pat. No. 3,174,736 "Carriage For Cutting Torches" issued Apr. 20, 1962 to E. H. Cameron discloses a cart that has been specifically designed to hold a welding torch in a fixed carriage. In contrast to the present invention, it provides no space to carry a gas bottle, is limited to where it can be used, nor does it have four wheels with pneumatic tires or an independent suspension which limits it's ability to be moved over rough terrain, nor does it provide equipment storage area and tool holders.

To overcome the above mentioned inadequacies, the present invention has an independent suspension system making the cart capable of traveling across a variety of terrains either by being manually pulled by a handle connected to the suspension system making it easy to control cart direction or by an interchangeable tow hitch which can replace the manual towing handle allowing the cart to be mounted onto a tow receiver and quickly driven away. Due to the cart's ground clearance, size of wheels and pneumatic tires, it can travel most terrains usually unavailable to standard welding carts.

In these respects, the present invention substantially departs from conventional concepts and designs shown in the prior art, and in so doing the present invention provides a new and unique invention primarily developed to provide independent suspension and steering capability.

OBJECTS OF THE INVENTION

The primary object of the present invention is to provide an all-terrain welding equipment cart to overcome shortcomings of the prior art in that it has a front independent suspension system consisting of a floating axle which has a limit stop device to prevent the axle from excess travel in a downward direction and which is independently supported by springs, enabling it to traverse over a variety of terrains where four-wheel vehicles are required to go such as at sporting events and track meets without sacrificing stability.

Another object of the present invention is to provide a welding cart that has suspension springs and steering tie rods to aid its ability to conquer rough terrain and ease of steering.

Another object of the present invention is in the provision of skid plates to protect steering axles from ground debris damage.

Another object of the present invention is to provide a suspension system with a towing/steering extension. Attached to the extension is a tongue to manually allowing an operator to pull it by the handle or replace the handle with a standard towing hitch.

It is a further object of the invention to provide an all-terrain welding equipment cart to be of sufficient height to clear obstacles such as rocks that would stop normal welding equipment carts.

A further object of the present invention is to provide a sturdy cart capable of hauling heavier welders and large or small bottles while providing a storage area and several hooks for tools and equipment to be stored.

Still another object of the present invention is to provide an interchangeable one-handed hauling handle easily replaced with a towing hitch allowing cart to be towed over a variety of terrains.

Yet another object of the invention is to provide a rotatable welder table allowing welding personnel to turn a tube under the table holding the welding unit to a desired position from which it is locked into position.

Another object of the present invention is to provide an independent flux/spray bottle container holder attached to the welding gas bottle holding frame.

Another object of the present invention is to provide a cage-like frame in which a gas bottle is held having a removable retaining strip along its uppermost rim acting like a gate when opened allows entry/exit of bottle and to which "E11" type brackets are affixed for hanging welding equipment.

Another object of the present invention is to provide a locking device attached to the steering system under the platform holding the welding unit when loosened permits the table to rotate to a desired angle providing for ease of operation.

Another object of the present invention is to provide large pneumatic tires mounted on oversized wheels connected to axles and suspension arms the lower portion of which are protected by skid plates on both front and rear providing protection from ground obstacles.

Another object of the present invention is to provide the exchange of either manual towing with a handle or vehicular towing with a hitch. To exchange from one to the other a pin located just below the upper end of the towing tongue is removed so that the handle or hitch can be extracted or inserted.

Another object of the present invention is a cart to be used as a rapid emergency response welding unit capable of traversing adverse terrain where welding work is urgently required and there is no time to offload equipment then load cart into it into the back of a truck or utility vehicle.

SUMMARY OF THE INVENTION

In view of the foregoing disadvantages inherent in the known types of prior art, the present invention provides a more stable and versatile base platform for traversing adverse terrain usually subjecting such carts to severe shock. The ease of towing either by hand or by a towing hitch facilitated by not only independent suspension axles but also a definitive steering system wherein the front wheels pivot at the end of floating axles providing more accurate steering without interfering with the suspension system.

This cart provides a compact platform for welding equipment needed on or off-site and is capable of being towed either by hand or by a vehicle and in an emergency situation it can be towed directly to the site via the hitch or handle. The platform supports both gas and electric welding equipment.

The rear end of the cart supports the gas bottle retained within a frame made of a durable strong material. The front end of the welding gas bottle holding frame supports two tool holders and a flux/spray container holder. The sides and back end of the frame support "E11" brackets for holding cables and hoses. The rear strip of the top portion of the gas bottle frame is removable to facilitate the exchange of gas bottles.

The front end of the cart consists of a base platform to hold equipment and a tube protruding upwards to a rotating table which can be locked in position by a locking mechanism mounted in the tube under the table holding the welding machine.

Under the base platform is both front and rear suspension. The rear suspension consists of two floating axles supported by two springs per axle and in between and under the axle mount is a skid plate to prevent damage to the axles. The axle mount also contains a limit stop for each suspension arm to prevent loss of the springs.

The front suspension system consists of two floating suspension arms supported by one spring per arm and similar to the rear suspension it includes mount, arm limit stops, and a skid plate. Aft of the suspension system is a towing extension which is pivoted from a point forward of the aft suspension system. The front end of the extension arm supports a pivot point for the towing tongue on the top. Under that pivot point two tie rods are attached to the pivoting extension arm that steers or turns the wheels as the extension arm and towing tongue are horizontally turned left/right.

DESCRIPTION OF THE DRAWING FIGURES

A complete understanding of the present invention may be obtained by reference to the accompanying drawings, when considered in conjunction with the subsequent, detailed description, in which.

For purposes of clarity and brevity, like elements and components will bear the same designations and numbering throughout the FIGURES.

DETAILED DESCRIPTION OF THE PREFERRED EMBODIMENTS OF THE INVENTION

With reference to the drawings, a detailed description of the invention and its use is as follows.

Figure 1:
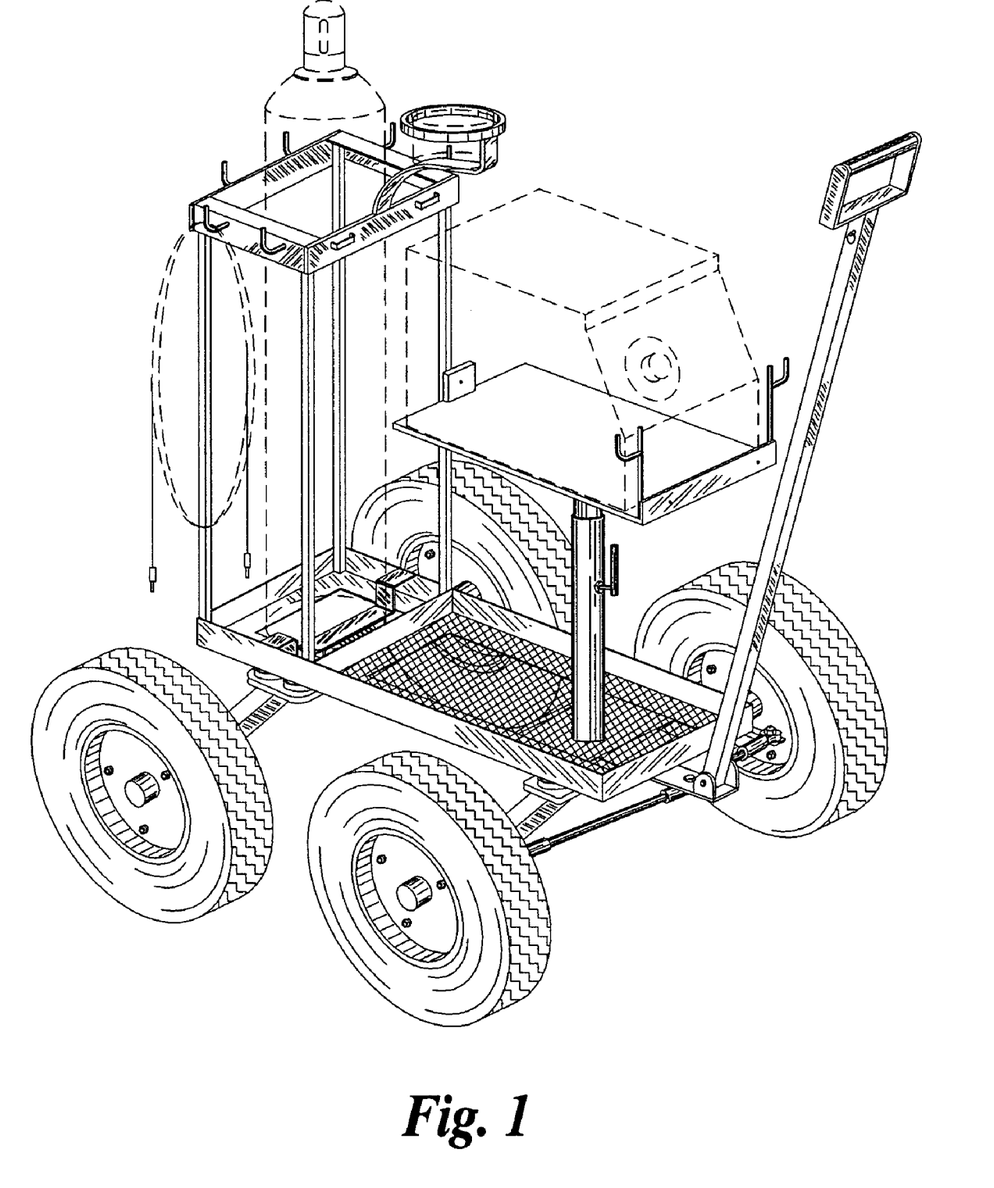
FIG. 1 shows an overall view of the cart of the present invention.

An overall view of the welding cart of the present invention is shown in FIG. 1. The base of the cart is referenced by numeral 2 which sits upon pneumatic tires mounted on wheels 40. At the front end of the cart is a towing/steering arm 28 and at the upper end of this arm 28 is a handle 30 for the manual operation of the towing/steering arm 28 which can be interchanged with a towing hitch 70 (not shown in this figure). At the front end of the cart, extending up from the base 2, is a rotating platform 6 which is designed to hold an electric welding machine 10. At the rear end of the cart is mounted a welding gas bottle holding frame 4 which holds a welding gas bottle 8. Hooks or similar may be placed around the upper end of the welding gas bottle holding frame 4 to hold welding cables and/or hoses 12. Also provided is a welding flux container holder/spray container holder 20 which sits at the upper end of the welding gas bottle holding frame 4. The rotating platform 6 (on which the welding unit sits) has two bolt holes in the front (facing the handle) and one bolt hold in the back (facing the gas bottle). Once the welding unit is placed on the rotating platform, the bolts are put through the holes thereby affixing themselves to the outside of the welding unit to hold it in place on the rotating platform.

Figure 2:
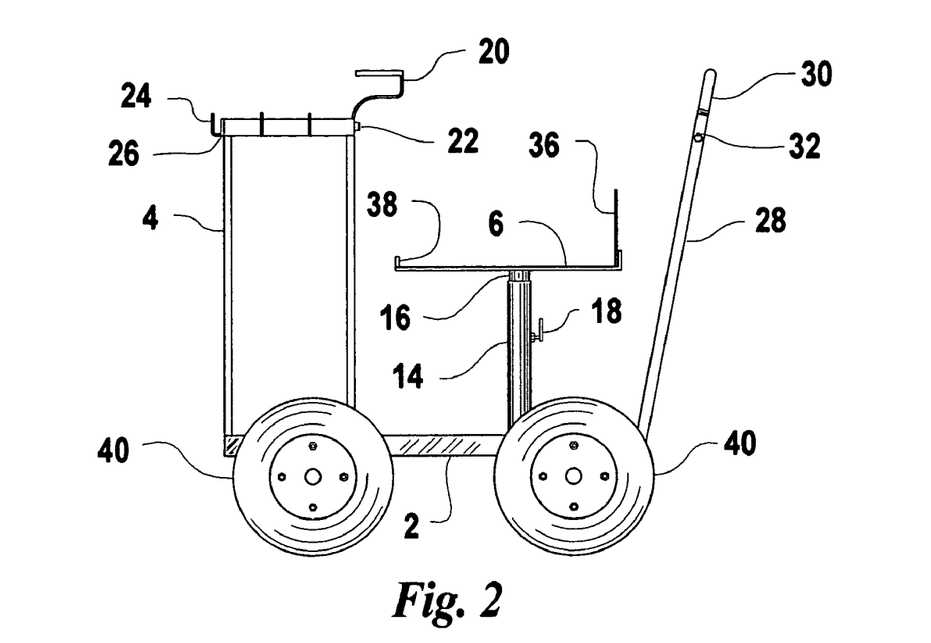
FIG. 2 shows a left-hand view of the welding cart of the present invention.
Figure 3:
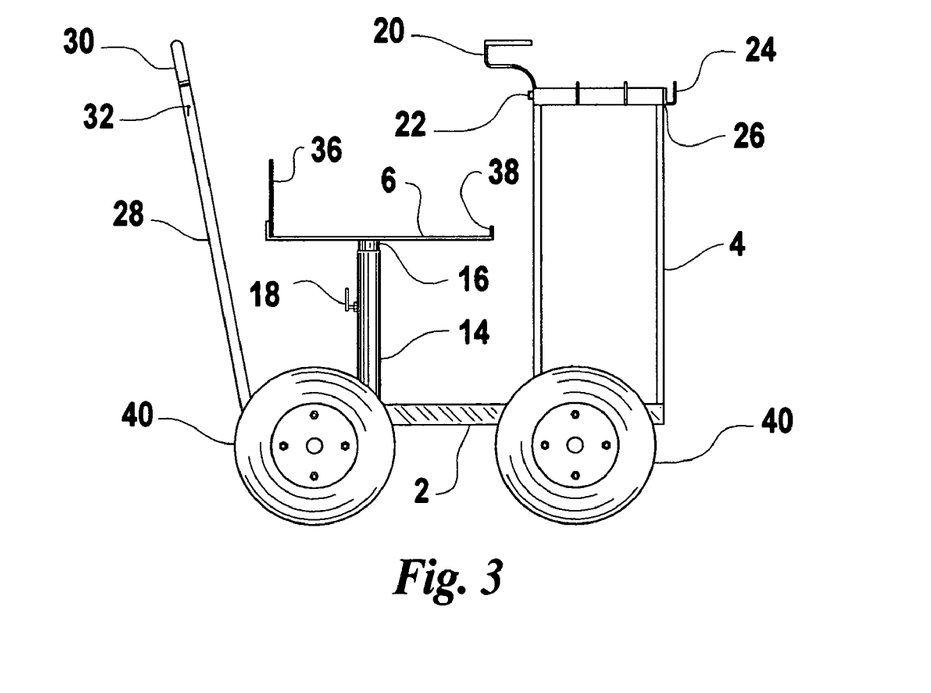
FIG. 3 shows a right hand view of the welding cart of the present invention.

Left and right hand views of the welding cart respectively are shown in FIGS. 2 and 3. These figures show "E11" type brackets 24 which are used to hang welding cables and/or hoses and a removable retaining strip 26 attached to the welding gas bottle holding frame 4 for ease of bottle replacement, this strip can be removed to insert a bottle and then replaced afterwards. A tool holder bracket 22 is placed on the upper end of the frame 4. On the rotating platform 6 is shown a lower mounting tube 14 for the platform 6, the upper internal mounting tube 16 is fitted into the lower mounting tube 14 and a lockable handle 18 for the rotating platform 6 is shown in it's preferred position. The platform 6 has "U" brackets 36 for "connected" or "in use" welding machine cables and a welding machine back stop 38 mounted on the upper surface of the rotating platform 6 prevents the welding machine from slipping off the platform 6. Reference numeral 32 shows a locking pin for interchanging the handle 30 with a hitch 70 fitted at the top of the towing/steering arm 28.

Figure 4:
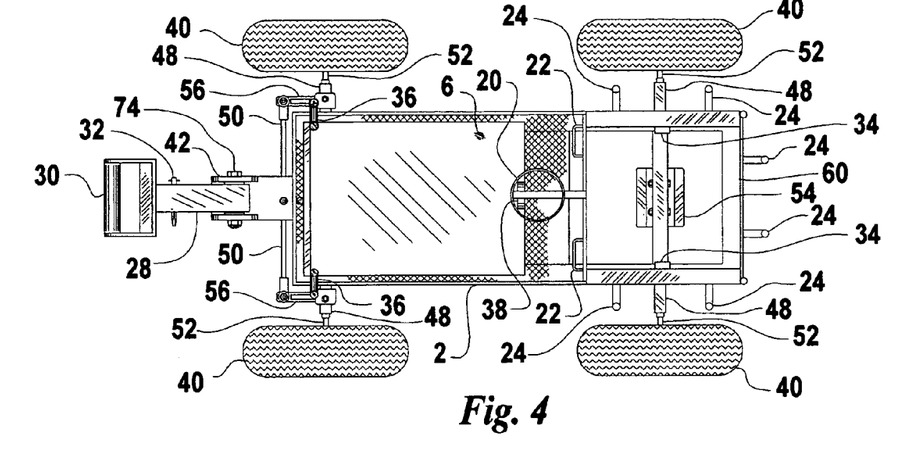
FIG. 4 shows the underside view of the welding cart of the present invention.
Figure 5:
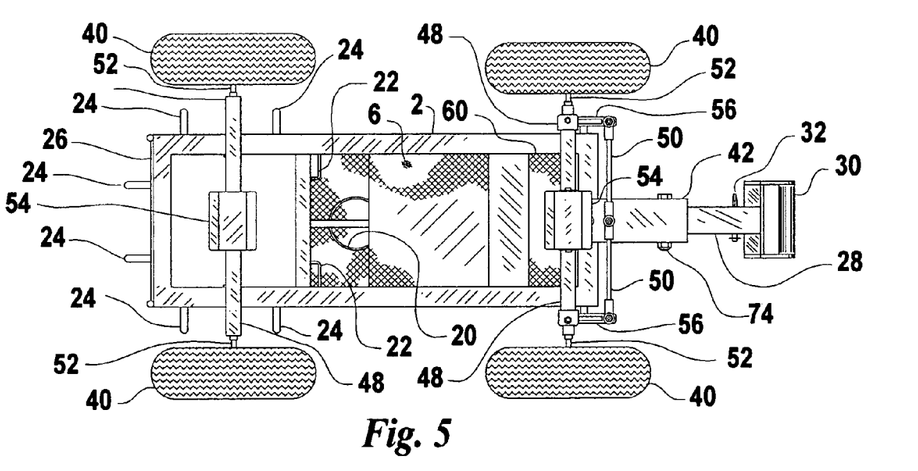
FIG. 5 shows another view of the underside of the welding cart of the present invention.

FIG. 4 shows a left-hand view and FIG. 5 shows a right hand view of the welding cart. The pneumatic tires mounted on the wheels are referenced by numeral 40, these are attached to axles 52 which are attached to suspension arms 48. The suspension arms 48 are attached to steering spindles 56 and tie rods (left and right) 50. The handle 30 is attached to the towing/steering arm 28 which is mounted to the welding cart by a towing/steering arm mounting bracket 42. The base of the welding cart is referenced by the numeral 2 and the rotating platform for an electric welding machine is shown at 6. The welding flux container holder/spray bottle holder is shown at 20, tool bracket holder 22 and "E11" brackets to hold welding cables and/or hoses 24. The cart has centering brackets 34 for the welding gas bottle 8 in the lower section of the gas welding bottle holding frame 4. Skid plates 54 and a lower shelf screen 60 are provided to prevent damage to the axles from debris on the ground. A welding machine back stop 38 is mounted on the upper surface of the rotating platform 6 to prevent the welding machine from slipping off the platform. In FIG. 4 numeral 36 shows "U" brackets 36 which are used for "connected" or "in use" welding machine cables.

Figure 6:
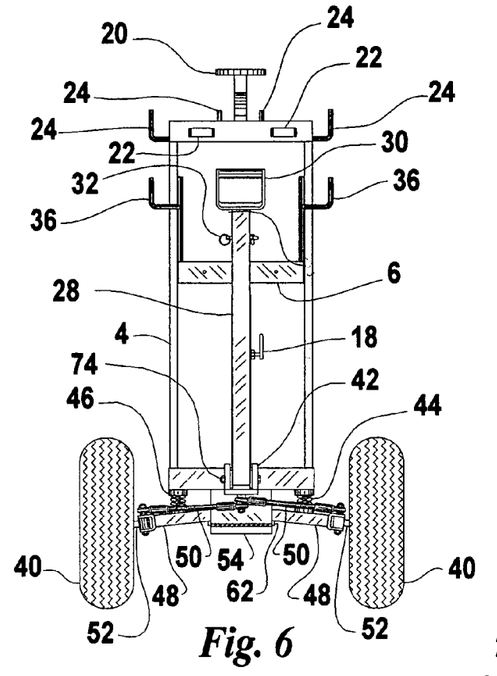
FIG. 6 shows a front end view of the welding cart of the present invention.

FIG. 6 shows a front view of the cart. The pneumatic tires mounted on wheels are shown at 40. These are connected via axles 52 to suspension arms 48. Reference numeral 50 shows the left and right tie rods that are connected at their upper side to suspension springs 44. Numeral 46 shows the suspension spring upper/lower retaining cups. The handle 30, for manual towing, is connected to the towing/steering arm 28 which is affixed to the cart by a towing/steering arm mounting bracket 42. The welding gas bottle holding frame 4 has at it's upper end "E11" type brackets 24 to hang welding cables and/or hoses, tool holder brackets 22 and a welding flux/spray bottle container holder 20. Also visible in this figure are "U" shaped brackets 36 which are used for "connected" or "in use" welding machine cables, the rotating platform 6 for an electric welding machine and a locking handle 18 for the rotating platform.

Figure 7:
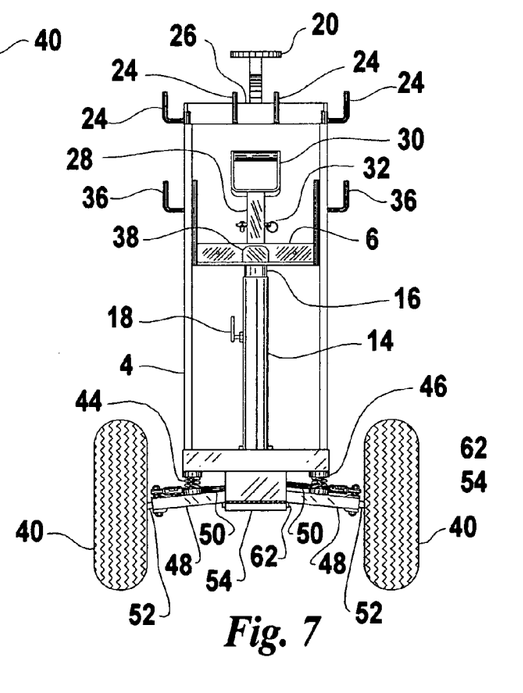
FIG. 7 shows a front end view of the welding cart of the present invention.

FIG. 7 shows a view from the rear of the cart. The reference numerals on this figure relate to the same components are those described above in relation to FIG. 6. FIG. 7 additionally shows the lower mounting tube 14 for the platform 6, the upper mounting tube 16 as fitted into the lower mounted tube 14, the welding machine backstop 38 mounted on the upper surface of the rotating platform 6 to prevent the welding machine from slipping off the platform 6 and the removable retaining strip 26 in the gas bottle holding frame 4 for ease of bottle replacement.

Figure 8:
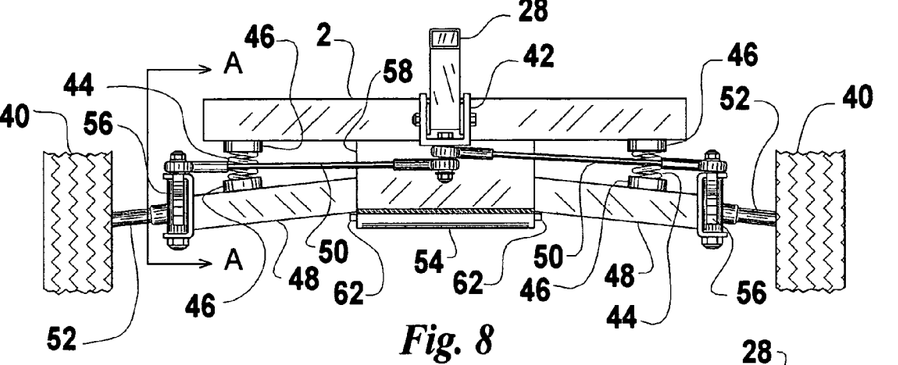
FIG. 8 shows a view of the suspension system of the welding cart of the present invention.
Figure 9:
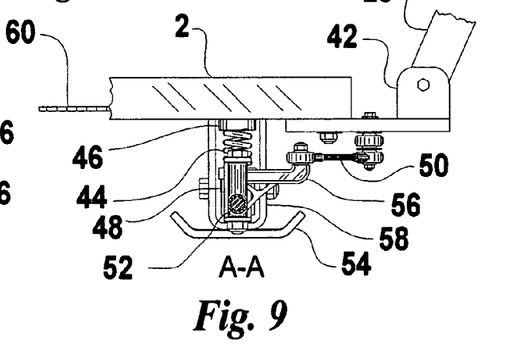
FIG. 9 shows a cross-sectional view of the side of the welding cart.
Figure 10:
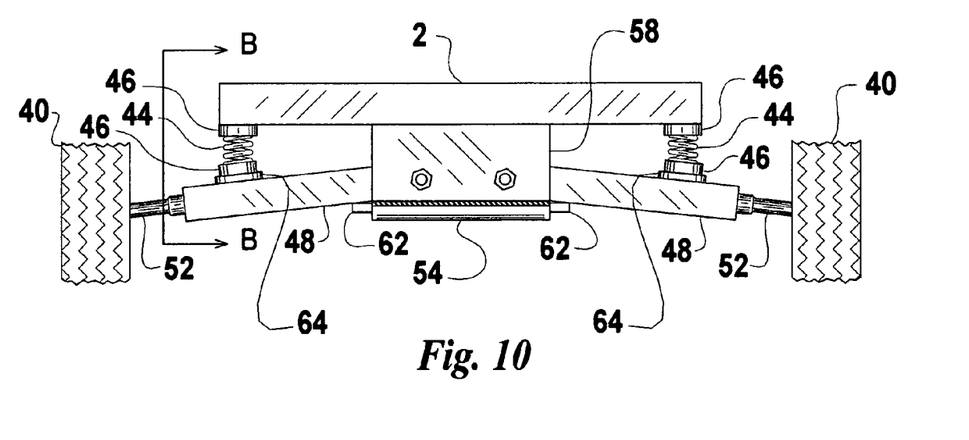
FIG. 10 shows a rear view of the welding cart.
Figure 11:
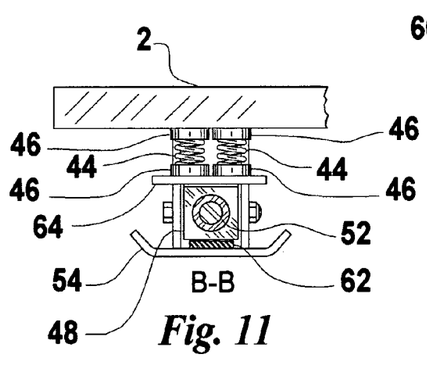
FIG. 11 shows a cross-sectional view of the side of the welding cart.

FIG. 8 is a view of the suspension system of the welding cart of the present invention shown from the front and FIG. 10 a rear view of the same. FIG. 9 shows the cut-away section through line A—A of FIG. 8 and FIG. 11 shows the cutaway section B—B shown in FIG. 10. A further explanation is given to the components below.

The base of the cart is referenced as numeral 2. The pneumatic tires mounted on wheels 40 are mounted on axles 52 and suspension arms 48 are mounted to the suspension arm mounting bracket 58. Steering spindles 56 are connected to tie rods 50 (left and right). The suspension springs 44 have suspension spring upper and lower retaining cups 46. Suspension arm limit stops 62 are connected to the mounting bracket 58.

FIG. 8 additionally shows the towing/steering arm bracket 42 and the towing steering arm 28. FIG. 9 additionally shows the welding cart lower screen shelf 60, the steering spindle 56, towing/steering arm mounting bracket 42 and the steering arm 28. FIG. 11 additionally shows the welding cart lower screen shelf 60, the dual suspension spring mounting plate 64 and the skid plate 54. The skid plate 54 and the dual suspension spring mounting plates 64 are also shown in FIG. 10.

Figure 12:
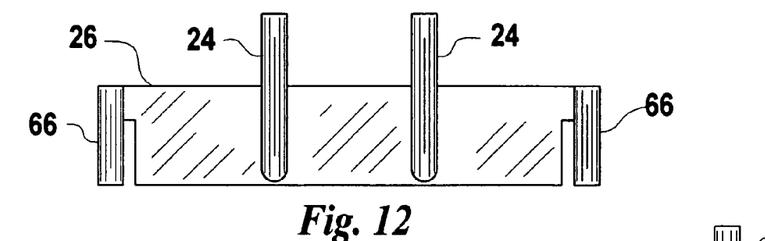
FIG. 12 shows a portion of the gas bottle holding frame.
Figure 13:
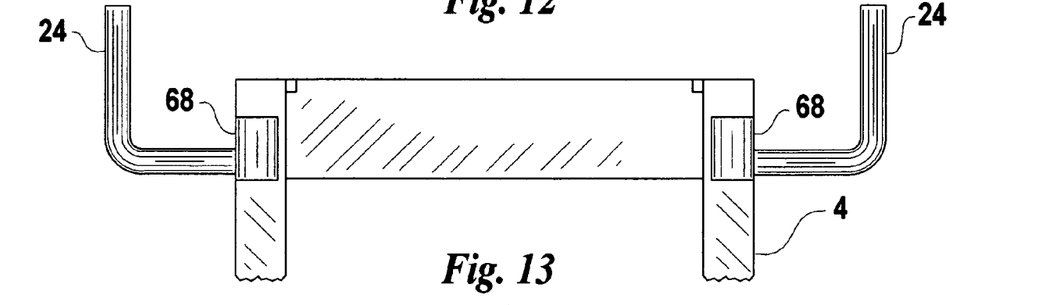
FIG. 13 shows a portion of the gas bottle holding frame.

FIG. 12 shows a front view and FIG. 13 shows a side view of the top end of the gas welding bottle holding frame 4 showing in more detail the positioning of the "E11" type brackets 24 and the removable retaining strip 26 which is used in the welding gas bottle holding frame 4 for ease of bottle replacement. At either end of the removable retaining strip 26 are retaining pins 66. These pins 66, as shown in FIG. 13, are retained within retaining pin holders 68.

Figures 14, 15:
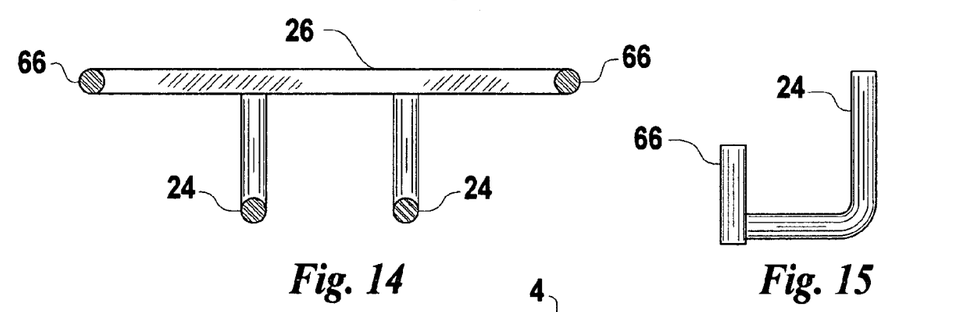
FIG. 14 shows the retaining mechanism for the gas welding bottle viewed from above.
FIG. 15 shows the bracket to hold pipes/cables.

The removable retaining strip 26 shown in FIG. 14 shows once again the retaining pins 66 as defined in FIGS. 12 and 13 above. This figure shows a top view of this part of the cart and also shown are the "E11" type brackets 24 to hang welding cables and/or hoses. FIG. 15 shows a separate view of the "E11" type brackets 24 and how they are affixed to the retaining strip retaining pins 66.

Figures 16, 17:
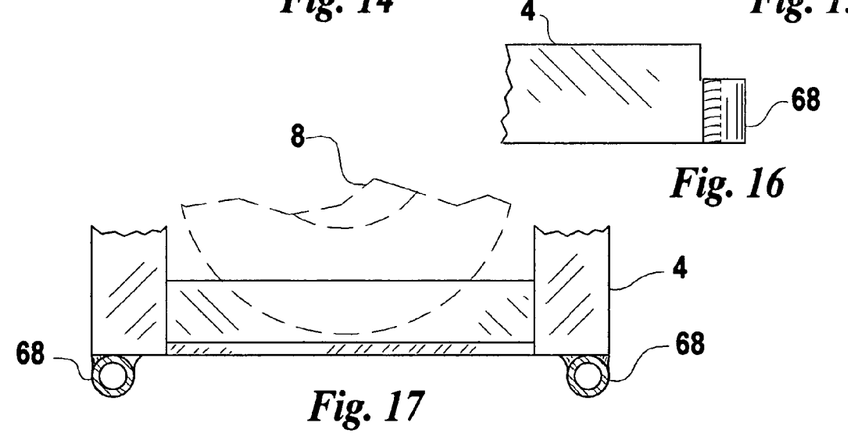
FIG. 16 shows the handle and towing hitch attachment pin.
FIG. 17 shows a schematic of a gas bottle in the cart of the present invention.

The lower part of the cart is shown in FIG. 17. The gas bottle holding frame 4 is shown holding a gas welding bottle 8 (shown in hashed lines). At the lower end of the frame 4 are shown the retaining pin holders 68. FIG. 16 shows a side view of the frame 4 and the retaining pin holder 68.

Figure 18:
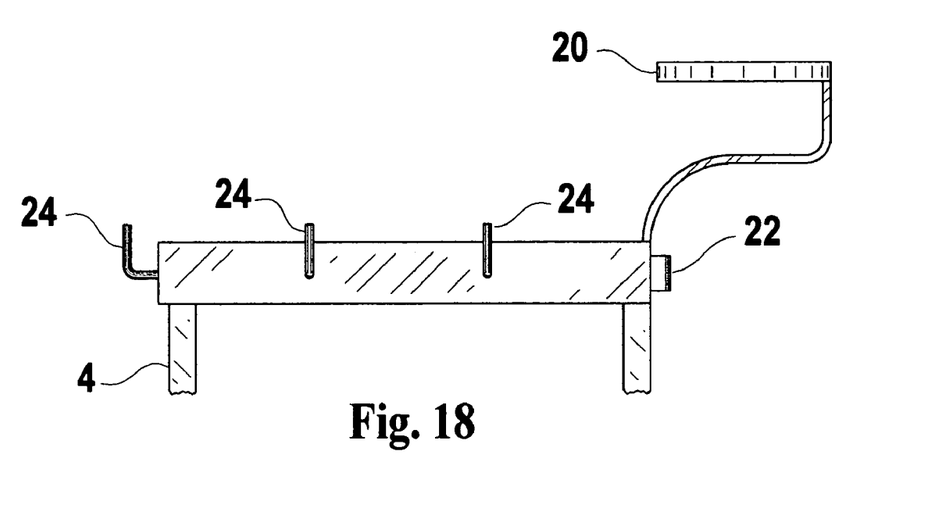
FIG. 18 shows a side view of the welding gas bottle holding frame.
Figure 19:
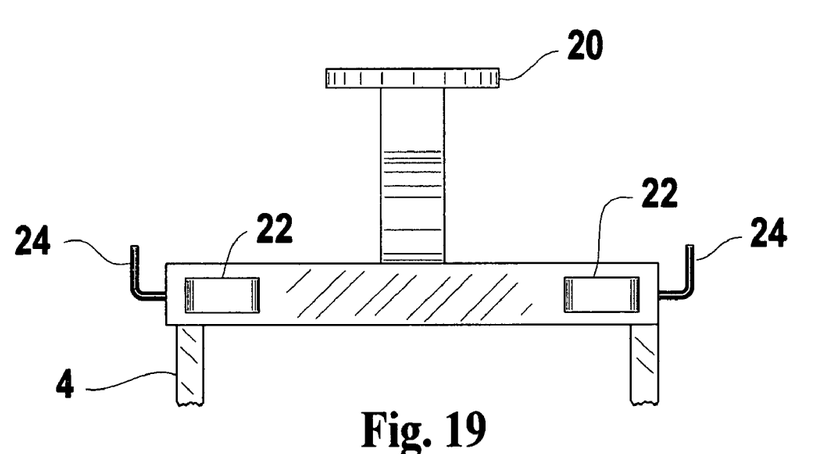
FIG. 19 shows a front view of the welding gas bottle holding frame.

FIG. 18 shows a side view and FIG. 19 shows a front view of the upper end of the gas bottle holding frame 4. These figures show the welding flux container/spray bottle holder 20 which is attached to the upper part of the gas bottle holding frame 4. Reference numeral 24 refers to the "E11" type bracket supplied to hang welding cables and/or hoses and reference numeral 22 shows the tool holder brackets.

Figure 20:
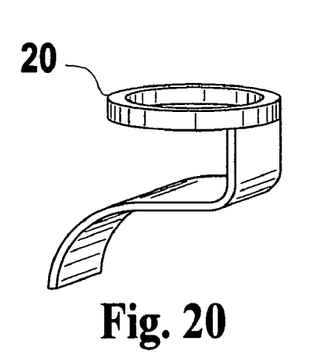
FIG. 20 shows a side view of the welding flux container holder.
Figure 21:
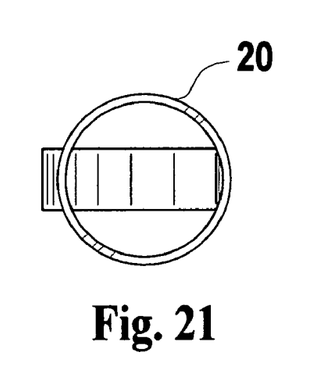
FIG. 21 shows a top view of the welding flux container holder.

FIG. 20 shows a side view and FIG. 21 shows an upper view of the welding flux container holder 20. This holder 20 may also be used to hold a spray bottle (not shown) filled with water to extinguish small fires if need be while welding or to cool off the metal and/or weld itself.

Figure 22:
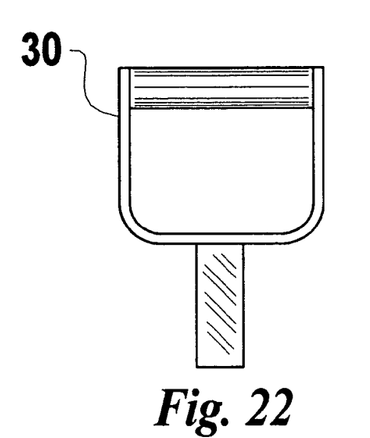
FIG. 22 shows a front view of the handle for manual operation of the towing/steering arm.
Figure 23:
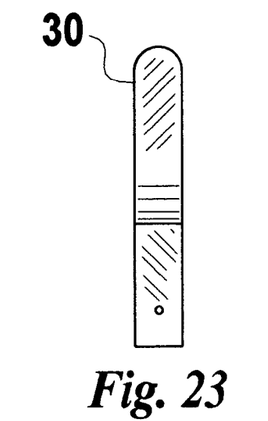
FIG. 23 shows a side view of the handle for manual operation of the towing/steering arm.
Figure 25:
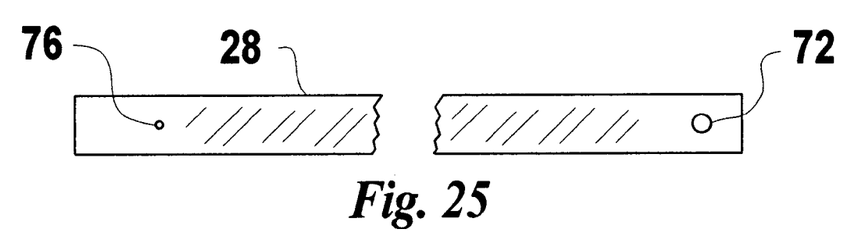
FIG. 25 shows the handle for manual operation of the towing/steering arm.

FIG. 22 shows a front view of the handle 30 and FIGS. 23 and 25 show side views of the handle 30.

Figure 26:
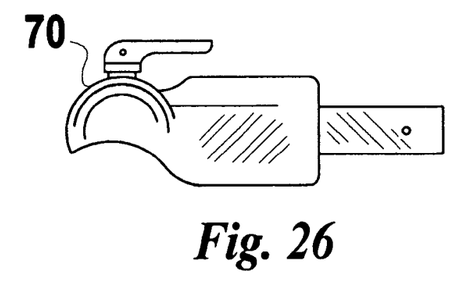
FIG. 26 shows the locking pin for interchanging the handle and hitch fitted at the top end of the towing/steering arm.
Figure 27:
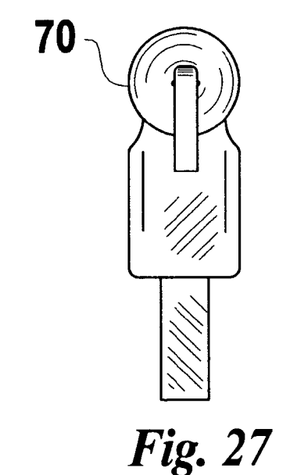
FIG. 27 shows the towing/steering arm.

FIG. 26 shows the locking pin 32 for interchanging the handle 32 and the hitch 70 fitted at the top of the towing/steering arm 28. FIG. 27 shows the towing/steering arm 28 with a hole 76 at one end which accepts the locking pin 32 shown in other figures for interchanging handle 30 and hitch 70 fitted at the top of the towing steering arm 28 and at the other end an axel bolt 74 hole 72.

Figure 24:
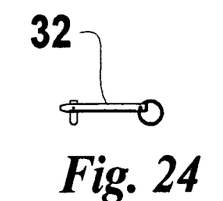
FIG. 24 shows the towing hitch.
Figure 28:
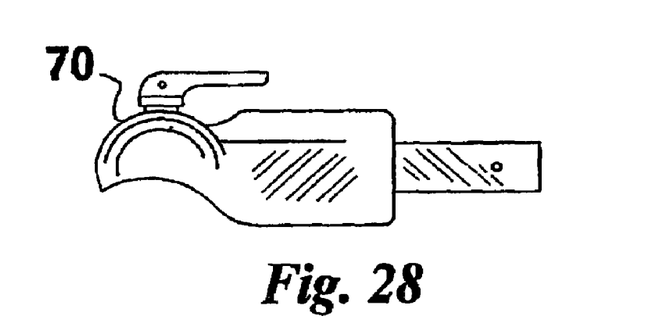
FIG. 28 shows a view of the towing hitch for the welding cart of the present invention.

FIG. 28 shows an expanded view of the towing hitch 70 which is interchangeable with the handle 30 if required and FIG. 24 shows an upper view of the towing hitch 70.

While this preferred embodiment of the invention has been shown and described, it will be apparent to those skilled in the art that various modifications may be made without departing from the spirit and scope of the present invention. For that reason, the scope of the invention is set forth in the following claims.

I claim:

1. An all-terrain welding equipment cart comprising a gas bottle, a welding machine and a base, which is supported by front and rear wheels, said front wheel having independent suspension system, said suspension system include suspension arms, each of the suspension arms including axles connected to end portion thereof, said suspension arms mounted to a mounting bracket, said mounting bracket having suspension arm limit stops mounted to a lower portion of the mounting bracket to prevent the axles from excess travel in a downward direction in relation to the base, said suspension arms independently supported by springs, wherein the welding cart having a gas bottle holding frame and a platform to support said welding machine.

2. An all terrain welding equipment cart of claim 1 wherein the springs are suspension springs, said cart also includes steering tie rods connected to the axles for steering purposes.

3. An all terrain welding equipment cart of claim 1 wherein the platform which is used to support a welding machine is rotatable.

4. An all terrain welding equipment cart of claim 1 wherein the platform which is used to support a welding machine is provided with a backstop mounted on the upper surface of the platform to prevent the welding machine from slipping off the platform.

5. An all terrain welding equipment cart of claim 1 wherein the platform which is used to support a welding machine is adjustable in position and can also be locked in place.

6. An all terrain welding equipment cart of claim 1 wherein the cart comprises skid plates on its lower surface to protect the axels from ground debris damage.

7. An all terrain welding equipment cart of claim 1, further comprising a towing extension of the form of a standard towing hitch which can be attached to any suitable vehicle equipped with a towing hitch.

8. An all terrain welding equipment cart of claim 1, further comprising a steering extension handle so that the cart is capable of being manually pulled by a handle.

9. An all terrain welding equipment cart of claim 1 wherein the cart is of sufficient height to clear obstacles such as rocks that would stop normal welding equipment carts being used in a particular application.

10. An all terrain welding equipment cart of claim 1 wherein the cart is capable of hauling heavy welders and large or small bottles while still providing a storage area and several hooks for tools and equipment to be stored.

11. An all terrain welding equipment cart of claim 1, further comprising an interchangeable one-handed hauling handle is provided which is easily replaced with a towing hitch allowing the cart to be towed over a variety of terrains.

12. An all terrain welding equipment cart of claim 1, further comprising a rotatable welder table is provided allowing welding personnel to turn a tube under the welding table holding the welding unit to a desired position after which it is locked into position.

13. An all terrain welding equipment cart of claim 1, further comprising an independent flux container holder is attached to the welding gas bottle holding frame.

14. An all terrain welding equipment cart of claim 1, further comprising an independent spray container holder is attached to the welding gas bottle holding frame, the spray being used to extinguish fires.

15. An all terrain welding equipment cart of claim 1 wherein the gas bottle holding frame is in the form of a cage-like frame in which a gas bottle is held, the frame having a removable retaining strip along its uppermost rim acting like a gate when opened allowing entry/exit of a cylinder bottle and to which brackets are affixed for hanging equipment.

16. An all terrain welding equipment cart of claim 1, further comprising a locking device is attached to the steering system under the platform holding the welding unit which when loosened permits the table to rotate to a desired angle providing for ease of operation.

17. An all terrain welding equipment cart of claim 1, further comprising large pneumatic tires mounted onto oversized wheels are connected to axles and suspension arms the lower portion of which are protected by skid plates on both front and rear providing protection from ground obstacles.

* * * * *